United States Patent
Dezelak et al.

(10) Patent No.: US 9,430,787 B2
(45) Date of Patent: Aug. 30, 2016

(54) MOBILE DEVICE AND COMPUTER READABLE MEDIUM FOR OBTAINING, ENCRYPTING, AND PACKAGING SECURITY TOKENS

(75) Inventors: Jonathan Eli Dezelak, Foster City, CA (US); Ka Hei Gary Lo, Thornhill (CA); Balaji Gopalan, Toronto (CA); Neerav Berry, Menlo Park, CA (US); Sanjay Kalyanasundaram, Millbrae, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 337 days.

(21) Appl. No.: 13/372,817

(22) Filed: Feb. 14, 2012

(65) Prior Publication Data

US 2013/0110662 A1    May 2, 2013

Related U.S. Application Data

(60) Provisional application No. 61/442,579, filed on Feb. 14, 2011.

(51) Int. Cl.
*G06Q 30/00*    (2012.01)
*G06Q 30/06*    (2012.01)

(52) U.S. Cl.
CPC ...... *G06Q 30/0601* (2013.01); *G06Q 30/0613* (2013.01)

(58) Field of Classification Search
CPC .......................................... G06Q 30/00–30/08
USPC ................................................ 705/26.1–27.2
See application file for complete search history.

(56) References Cited

U.S. PATENT DOCUMENTS

| | | | | |
|---|---|---|---|---|
| 2010/0306099 | A1* | 12/2010 | Hirson et al. | 705/38 |
| 2012/0066121 | A1* | 3/2012 | Shahbazi | G06Q 20/102 705/40 |
| 2012/0143761 | A1* | 6/2012 | Doran | G06Q 20/40 705/44 |
| 2012/0185383 | A1* | 7/2012 | Demark et al. | 705/40 |

FOREIGN PATENT DOCUMENTS

CA    2768115 A1    8/2012

OTHER PUBLICATIONS

"Canadian Application Serial No. 2,768,115, Response filed Apr. 17, 2014 to Office Action mailed Nov. 22, 2013", 16 pgs.
"European Application Serial No. 12155469.5, Response filed Apr. 16, 2014 to Office Action mailed Feb. 25, 2014", 25 pgs.
"European Application Serial No. 12155469.5, Summons to Attend Oral Proceedings mailed May 20, 2014", 10 pgs.
"European Application Serial No. 12155469.5, Office Action mailed Feb. 25, 2014", 7 pgs.

(Continued)

*Primary Examiner* — Michael Misiaszek
(74) *Attorney, Agent, or Firm* — Jose Gutman; Fleit Gibbons Gutman Bongini & Bianco P.L.

(57) ABSTRACT

An electronic device receives a third-party beneficiary selection at least one of a good, a service, and a payment. A set of contacts is presented in response to receiving the selection. A selection of at least one promisor from the set of contacts is received. A wireless message comprising at least an identifier of the third-party beneficiary selection is generated. The wireless message is transmitted to a mobile device associated with the at least one promisor.

13 Claims, 14 Drawing Sheets

(56) References Cited

OTHER PUBLICATIONS

"Canadian Application Serial No. 2,768,115, Office Action mailed Nov. 26, 2013", 2 pgs.
"European Application Serial No. 12155469.5, Extended Search Report mailed Jun. 27, 2012", 6 pgs.
"European Application Serial No. 12155469.5, Response filed Feb. 22, 2013 to Extended European Search Report mailed Jun. 27, 2012", 23 pgs.
"Canadian Application Serial No. 2,768,115, Office Action mailed Oct. 15, 2014", 3 pgs.
Canadian Office Action dated Jul. 23, 2015, received for Canadian Application No. 2,768,115.

* cited by examiner

MOBILE DEVICE AND COMPUTER READABLE MEDIUM FOR OBTAINING, ENCRYPTING, AND PACKAGING SECURITY TOKENS

PRIORITY APPLICATION

This application claims the priority of U.S. Provisional Application Ser. No. 61/442,579, filed Feb. 14, 2011, which is incorporated herein by reference in its entirety.

FIELD OF THE DISCLOSURE

The present disclosure generally relates to electronic messaging, and more particularly relates to procuring goods/service/funds utilizing messages between electronic devices.

BACKGROUND

Electronic devices, such as wireless communication devices, have evolved such that a user is now able to perform many functions on a single device. For example, users are able to send messages to other devices, browse virtual environments and marketplaces, purchase goods and services, etc. However, current technologies generally fail to provide an efficient and useful nexus between these capabilities.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e., open language). The term "coupled" as used herein, is defined as "connected" although not necessarily directly, and not necessarily mechanically.

The terms "wireless communication device" and "mobile device" are used herein interchangeably and are intended to broadly cover many different types of devices that can wirelessly receive signals, and in most cases can wirelessly transmit signals, and may also operate in a wireless communication system. For example, and not for any limitation, these devices can include any one or a combination of the following: a two-way radio, a cellular telephone, a mobile phone, a smartphone, a two-way pager, a wireless messaging device, a laptop/computer, a personal digital assistant, a tablet computing device, and other similar devices.

Described below are systems and methods for message based procurement. An electronic device receives a third-party beneficiary selection that is at least one of a good, a service, and a payment from a user. The at least one of a good, a service, and a payment is to be used by and benefit the user. A second set of contacts is presented to the user in response to receiving the selection. A selection of at least one promisor from the set of contacts is received from the user. A wireless message comprising at least an identifier of the user and the third-party beneficiary selection is generated. The wireless message is transmitted to a mobile device associated with the at least one promisor.

Operating Environment

Figure 1:
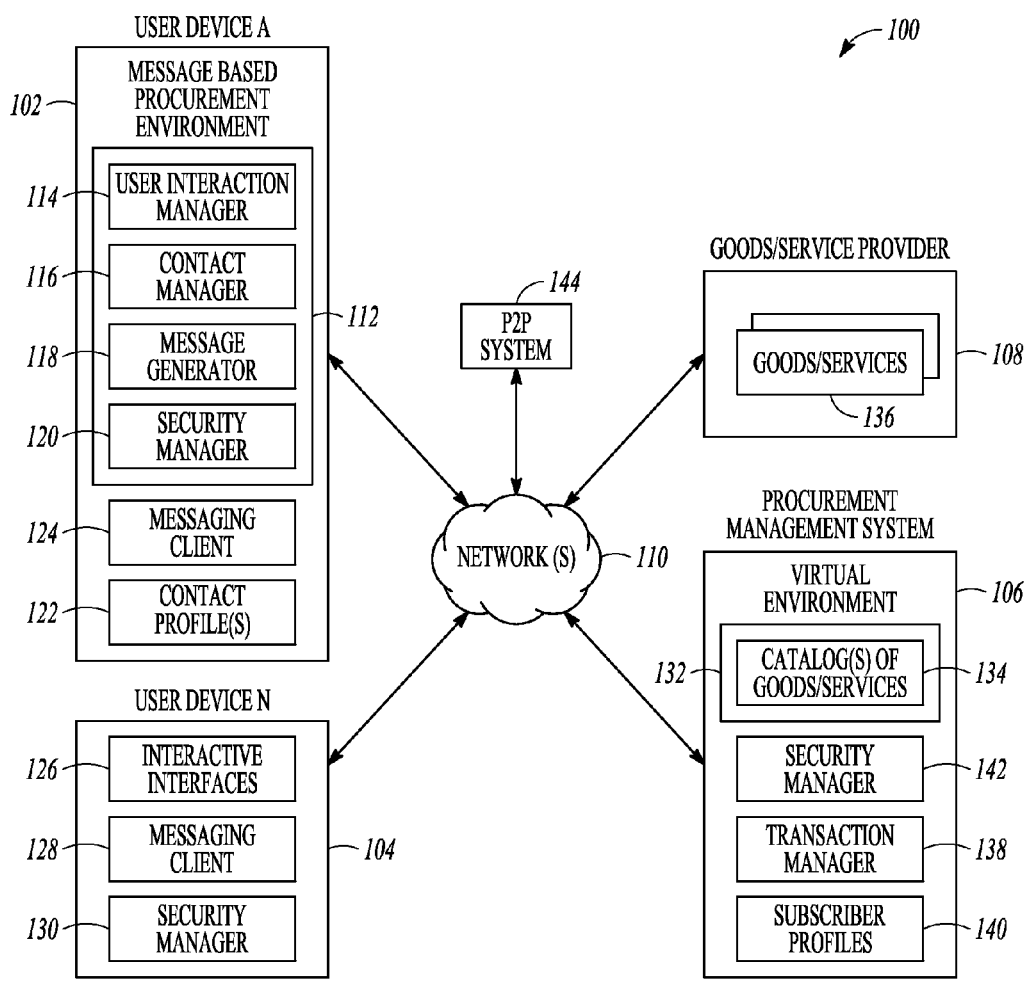
FIG. 1 is a block diagram of an operating environment according to one example.

FIG. 1 is a block diagram illustrating one example of an operating environment 100 for message based procurement of goods, services, and or funds using a wireless communication device (or any other type of electronic device capable of transmitting messages to another electronic device). The operating environment 100 comprises a plurality of user devices 102, 104 and systems 106, 108 communicatively coupled to each other through one or more wireless networks 110. The wireless network(s) 110 can include one or more communication networks. The wireless communications standard(s) of the network(s) 110 can comprise Code Division Multiple Access (CDMA), Time Division Multiple Access (TDMA), Global System for Mobile Communications (GSM), General Packet Radio Service (GPRS), Frequency Division Multiple Access (FDMA), Orthogonal Frequency Division Multiplexing (OFDM), Orthogonal Frequency Division Multiple Access (OFDMA), Wireless LAN (WLAN), WiMAX or other IEEE 802.16 standards, Long Term Evolution (LTE), or any other current or future wireless communication standard.

The user devices 102, 104 can be electronic devices such as, but not limited to, wireless communication devices, information processing systems such as notebook, tablet and desktop computers, and/or the like. At least one user device 102 comprises a message based procurement environment (MBPE) 112. In one example, the MBPE 112 is a tool such as, but not limited to, an application, a website, a web application, a mashup, etc., that allows the user of the device 102 to request, via a message, one or more other users to fund (or partially fund) a purchase of a good, a purchase of a service, or a payment on behalf of the user. The message can be a wireless or wired based message.

Additionally, the MBPE 112 further allows the user of the device 102 to perform a "gifting" operation where the user funds (or partially funds) a purchase of a good, a purchase of a service or a payment on behalf of the user using the device 102. In one example, these goods, services, and transactional services (e.g., transfer of funds) are offered through a virtual environment 132, such as a virtual marketplace, hosted by one or more information processing systems such as the procurement management system 106. However, these goods, services, and transactional items can also be offered by physical entities as well. It should be noted that, in one or more examples, the MBPE 112 is not associated with a virtual environment 132, but is associated with a given service such as a pre-paid account or stored value replenishment service, a virtual wallet application, or the like. The virtual wallet application allows the user to, among other things, transfer funds between users, manage and maintain funds or payment methods within the virtual wallet, and/or the like. Additionally, the functionality of the MBPE 112 can be built into a messaging client 124 such as, but not limited to, a P2P messaging client. In this example, a user can user utilize P2P messages to request or send funds to other users, request goods/services to be purchased by other users, purchase goods/services for other users, and/or the like.

In one example, the MBPE 112 comprises a user interaction manager 114, a contact manager 116, a message generator 118, and a security manager 120. The user interaction manager 114 manages a user's interaction with the MBPE 112. The contact manager 116 manages one or more sets of contact profile(s) 122 associated with the user and presents these contacts from these contact profile(s) 122 or at least a subset of these contacts to the user when performing a request or gifting operation through the MBPE 112. For example, based on the type of transaction (e.g., purchase of a good/service, transfer of funds, etc.) being requested by the user, the contact manager 116 identifies a set of contacts from the various contact profile(s) 122 associated with the user that comprises a set of potential contacts capable or willing to fulfill the user's request. The contact profile(s) 122 can include contacts associated with specific messaging types such as peer-to-peer messages, email messages, SMS/MMS messages, social networking messages, or the like. Alternatively, the contact profile(s) 122 can comprise contacts associated with various social communities such as, but not limited to, a "friends" community, a business community, a social networking community, or the like. Also, the user is able to designate a set of contacts within the contact profile(s) 122 that the contact manager 116 is to either consider and/or ignore. For example, the user can create a set of rules that instruct the contact manager 116 to ignore the user's business contacts and only consider the user's personal contacts.

The message generator 118 manages the creation and reception of request/gift messages and operates in conjunction with one or more messaging clients 124. It should be noted that the following discussion references a "request message" and a "gift message". A request message is a third-party beneficiary message sent from a first user (also referred to as a "gift requestor" or "requesting user") to at least a second user, or promisor, that requests the second user to fund (or partially fund) a purchase of a good, a purchase of a service, and/or a payment to or from the first user, for the use and benefit of the first user. A gift message is a message sent from a first user to a second user indicating that the first user has funded (or partially funded) a purchase of a good, a purchase of a service, and/or a payment to or from the second user, for the use and benefit of the second user.

The messaging client 124 manages the communication of messages (wireless or wired based messages) to and from one or more other user devices 104. For example, the message generator 118 is operable to generate a request message based on a user's interaction with the MBPE 112 and the messaging client 124 is operable to wirelessly transmit this request message as a peer-to-peer (P2P) message (or any other type of message) to another user device 104. The security manager 120 provides various levels of security within the MBPE 112. For example, the security manager 120 can encrypt outgoing messages and decrypt incoming messages. Also, the security manager 120 can communicate with various entities to obtain security mechanisms to be included within an outgoing message. It should be noted that one or more of the MBPE components discussed above can reside outside of the MBPE 112, and optionally within another component such as, but not limited to, the messaging client 124. The MBPE 112 and its components are discussed in greater detail below.

FIG. 1 also shows that one or more user devices 104 comprise one or more interactive interfaces 126, one or more messaging clients 128, and a security manager 130. The one or more interactive interfaces 126, in one example, are tools such as, but not limited to, a web browser, a mashup, an application, or the like for interacting with one or more client-server applications, such a virtual environment 132 hosted by the procurement management system 106, websites, or the like. The messaging client 128 is similar to the messaging client 124 discussed above. For example, the messaging client 128 allows the user of the device 104 to send and receive one or more messages of varying types such as, but not limited to, as peer-to-peer messages, email messages, SMS/MMS messages, social networking messages, or the like. The security manager 130 is similar to the security manager 130 discussed above. For example, the security manager 130 provides various levels of security when sending, receiving, and interacting with messages. For example, the security manager 130 can encrypt outgoing messages and decrypt incoming messages. Also, the security manager 130 can communicate with various entities to obtain security mechanisms to be included within an outgoing message.

FIG. 1 further shows a procurement management system 106. The procurement management system 106, in one example, provides a virtual environment 132 to users who have subscribed thereto. The user is able to interact with the virtual environment 132 via the MBPE 112. The virtual environment 132 comprises one or more electronic catalogs 134 of goods and services 136 that are provided by a goods/service provider 108. For example, the electronic catalogs 134 can comprise electronic/digital goods, such as, digital music, digital movies, digital photographs, applications, games, or the like. The electronic catalogs 134 can comprise services or transactional services, such as, pre-paid account or stored value account replenishment and fund transfer services. It should be noted that the electronic catalogs 134 are not limited to digital goods/services. For example, the catalogs 134 can also comprise entries associated with tangible goods as well, such as, goods/services that are offered through physical entities as well. It should be noted that the electronic catalogs 134 can reside on other systems as well, and are not limited to residing at the procurement management system 106.

A user, in one example, is able to interact with the virtual environment 132 via the MBPE 112. For example, a user can purchase, gift (i.e., fund a purchase/payment for another user for the use by and benefit of the other user), or request another user to fund a purchase of a good, a purchase of a service, and/or a payment (which can include a transfer of funds from the other user to the requesting user or to a third entity on behalf of the requesting user) through the MBPE 112, as will be discussed in greater detail below. It should be noted that in other examples, a user device, such as User Device N 104 shown in FIG. 1, is not required to comprise the MBPE 112 to interact with and perform transactions within the virtual environment 132.

The procurement managing system 106 also comprises a transaction manager 138 that manages the various transactions within the virtual environment 132. For example, the transaction manager 138 manages purchases of items within the virtual environment 132, processes payments for the purchases, and the like. The procurement management system 106 further comprises subscriber profiles 140 that maintain information associated with users who have subscribed to the virtual environment 132. For example, subscriber profiles 140 can include a user identifier, a user password, shipping information, billing information, payment information, device information, and the like associated with a subscribed user. It should be noted that a user, in some examples, is not required to have actively subscribed to the virtual environment 132. For example, by simply being a customer of a given wireless carrier or having a specific device, the user may automatically be subscribed to the virtual environment 132.

The procurement management system 106 further comprises a security manager 142 that provides various forms and levels of security for the virtual environment 132 and transactions associated therewith. For example, the security manager 142 provides one or more secure connections between the user devices 102, 104 and the procurement management system 106. The security manager 142 authenticates users who are interacting with the virtual environment 132. The security manager 142 also secures the transactions occurring at the procurement management system 106. It should be noted that one or more components of the procurement management system 106 can reside at one or more different systems. For example, the transaction manager 138 can reside at one or more remote systems. Also, the goods and services 136 associated with the electronic catalogs 134 can reside on the procurement management system 106 as well. The procurement management system 106 and its components are discussed in greater detail below.

The goods/service provider 108 provides the goods/services 136 to a user, which are offered through the electronic catalogs 134 of the virtual environment 132. Once the procurement management system 106 informs the goods/service provider 108 that a successful transaction has taken place, the goods/service provider 108 provides the goods/services 136 to the appropriate user, which can either be the actual purchaser or another recipient such as a gift recipient or a requesting user. For example, if the transaction is for a digital music file the goods/services provider 108 can transmit (by wireless or wired communication mechanisms) the music file to the appropriate device 102, 104. Alternatively, the device 102, 104 is able to download the music file directly from the goods/service provider 108. If the transaction was for a physical item, the goods/service provider 108 can ship or at least initiate the shipment of the good to the user.

P2P Messaging

Figure 2:
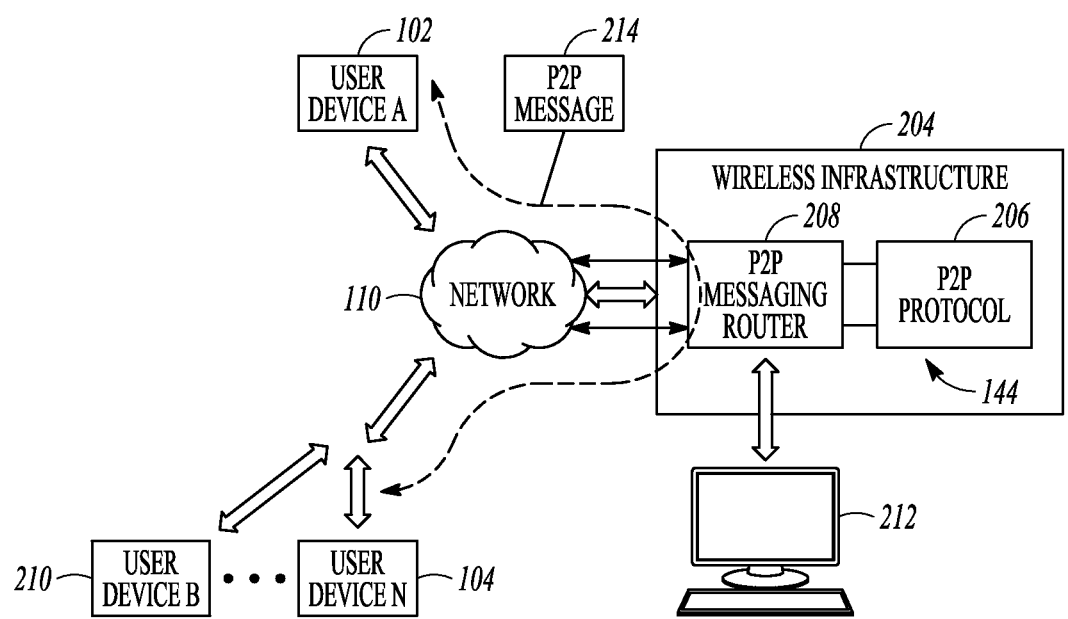
FIG. 2 is a block diagram of a configuration for a wireless infrastructure and a peer-to-peer (P2P) system according to one example.

As discussed above, one type of message that can be generated by the MBPE 112 is a P2P message. In one example, the operating environment 100 comprises a P2P system 144, as shown in FIG. 1. The P2P system 144, in this example, is a component of a wireless infrastructure 204 associated with the one or more networks 110. In particular, FIG. 2 shows one example of a configuration that is suitable for a user device 102 to conduct a P2P communication (e.g. instant messaging, application on application platform, etc.) with contacts included in their contact profile(s) 122. It can be seen in FIG. 2 that the P2P system 144 is incorporated into the wireless infrastructure 204 of the network 110. The P2P system 144 can utilize any suitable P2P protocol 206 operated by a P2P messaging router 208, in this example as part of the wireless infrastructure 204. It can be appreciated however that a stand-alone P2P configuration (i.e. that does not rely on the wireless infrastructure 204—not shown) may equally apply the principles herein. The example configuration shown in FIG. 2 is particularly suitable for implementing a PIN-based messaging system. As can be seen, the P2P messaging router 208 may also enable user devices 102, 104, 210 to communicate with desktop computers 212 thus facilitating, for example, communications such as instant messaging (IM) between mobile applications and desktop applications on the desktop computer 212.

In the example illustrated in FIG. 2, a P2P-based messaging system such as a PIN-based messaging system can be implemented using a router-based communication infrastructure, such as one that provides email, SMS, voice, Internet and other communications. Particularly suitable for hosting the P2P messaging router 208, is a wireless router or server used in systems such as those that provide push-based communication services. In FIG. 2, the wireless infrastructure 204 facilitates P2P communications such as instant messaging between user device 102 and user devices for User N 104 and User B 210 respectively using the P2P messaging router 208. It will be appreciated that the number of users participating in the example shown in FIG. 2 is for illustrative purposes only. P2P messaging, such as IM, is provided by an associated application stored on each user device 102, 104, 210 which can be initiated, for example, by highlighting and selecting an icon from a display as is well known in the art. The P2P messaging router 208 routes messages between the user devices 102, 104, 210 according to the P2P protocol 206. For example, the P2P protocol 206 may define a particular way in which to conduct IM or other types of messaging.

In general, in a P2P protocol 206, the sender of the P2P message 214 knows the source address of the intended recipient, e.g., a PIN. This may be established when the two devices request to add each other to their respective contact or buddy lists. It can be seen in the example shown in FIG. 2 that user device 102 can communicate directly with any of the user devices 104, 210 through the P2P messaging router 208, as indicated by the short-dashed line, without requiring a dedicated server for facilitating communications. In other words, the P2P messaging router 208 enables the user devices 102, 104, 210 to communicate with each other directly over the wireless infrastructure 204 in accordance with the P2P protocol 206.

When conducting a P2P session according to the embodiment shown in FIG. 2, the user devices 102, 104, 210 can communicate directly with the wireless infrastructure 204 in a client based exchange where, as noted above, an intermediate server is not required. A P2P message 214 sent by one user device 102 is received by the wireless infrastructure 204, which obtains the source address for the intended recipient from information associated with the P2P message 214 (e.g. a data log) or from the message 214 itself. Upon obtaining the recipient's address according to the P2P protocol 206, the wireless infrastructure 204 then routes the P2P message 214 to the recipient associated with the user device 104, 210 having such address. The wireless infrastructure 204 typically also provides a delivery confirmation to the original sender, which may or may not be displayed to the user. The destination device can also provide such delivery information. The wireless infrastructure 204 should be capable of routing messages 214 reliably and hold onto the P2P messages 214 until they are successfully delivered. Alternatively, if delivery cannot be made after a certain timeout period, the wireless infrastructure 204 may provide a response indicating a failed delivery. The wireless infrastructure 204 may choose to expire a P2P message 214 if a certain waiting period lapses.

Message Based Procurement of Goods, Services, and Funds

The following is a more detailed discussion on message based procurement of goods, services, and funds utilizing the MBPE 112 (and other mechanisms) discussed above. It should be noted that although the followings examples are given with respect to the MBPE 112 and the virtual environment 132, the present invention is not limited to such examples. For example, the MBPE 112 can be associated with a single good or service, such as, pre-paid account replenishment or can be implemented within a messaging client where funds can be transferred between user accounts via messages.

Figure 3:
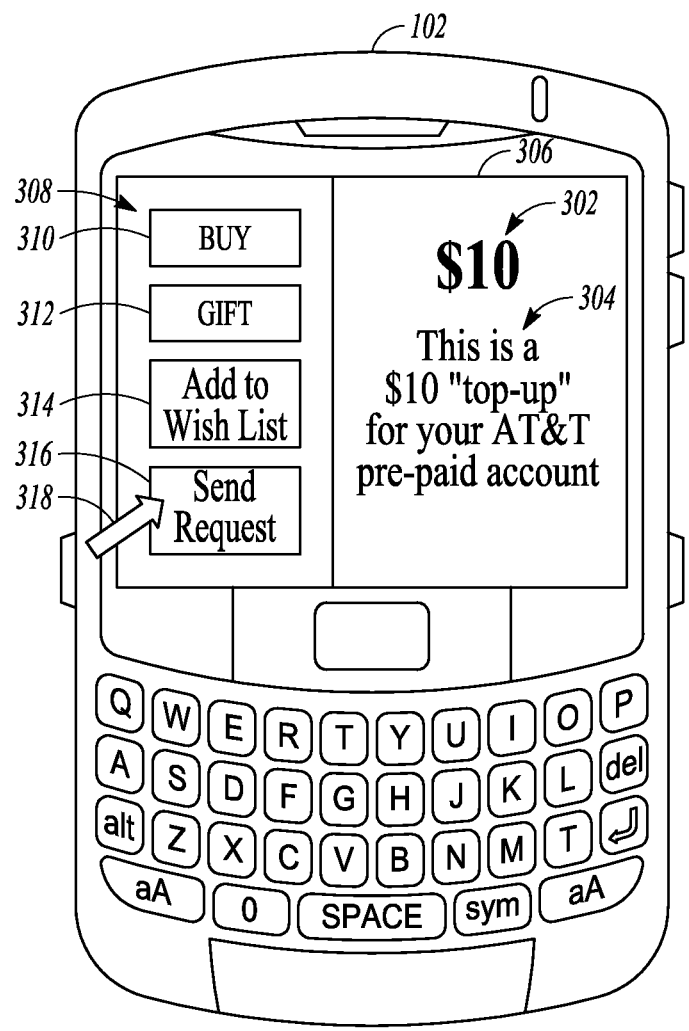
FIG. 3 shows an environment on an electronic device that allows a user to perform various operations with respect to a good, service, and/or payment according to one example.

FIG. 3 shows a user device 102 on which the user is utilizing the MBPE 112 to browse through one or more electronic catalogs 134 provided by the virtual environment 132. It should be noted that the user is not limited to browsing through an electronic catalog 134 to identify items of interest. For example, the user can scan a barcode of a physical object, take a picture of a physical object, or the like, and transmit this information to the virtual environment 132. The virtual marketplace can then display these items, as provided in an electronic catalog 134, to the user or notify the user that these items are not available. As can be seen in FIG. 3, the user, via the MBPE 112, has selected an item in an electronic catalog 134. In the example of FIG. 3, the user has selected a $10 credit to replenish his/her wireless carrier pre-paid account. It should be noted that goods/services can also include subscriptions to magazines, newspapers, streaming services, etc. In this example, either the first (requesting user) or second (funding user) device is able to cancel the subscription.

The user interaction manager 114 of the MBPE 112 determines that the user has selected an item and, as a result, displays this item in a portion 302 of the device display 306 along with a description 304 of the item and various actions 308 that the user can take with respect to this item. For example, the user is presented with a first option 310, which allows the user to buy/purchase the selected item using one or more payment methods. A second option 312 allows the user to purchase this item as a "gift" on behalf of another user for the use and benefit of the item by the other user. A third option 314 allows the user to save the item in a wish list that can be shared with one or more other users. These other users are able to view the wish list and purchase the items within the wish list as a gift for the user. In addition, the first user is able to add an item to his/her wish list and request that multiple users partially pay for the requested item. For example, consider a user named Tom. Tom selects an item from an electronic catalog 134 and adds the item to his wish list. Tom is then able to send a request message (as will be discussed in greater detail below) to one or more other users, such as his family members, to each partially pay for the requested item. In addition, Tom can also pre-designate an amount for each of his family members to pay. A fourth option 316 allows the user to send a request to one or more other users to fund a purchase this item (or fund a payment if the item selected is a payment to another entity or a transfer of funds to the requesting user).

Figure 4:
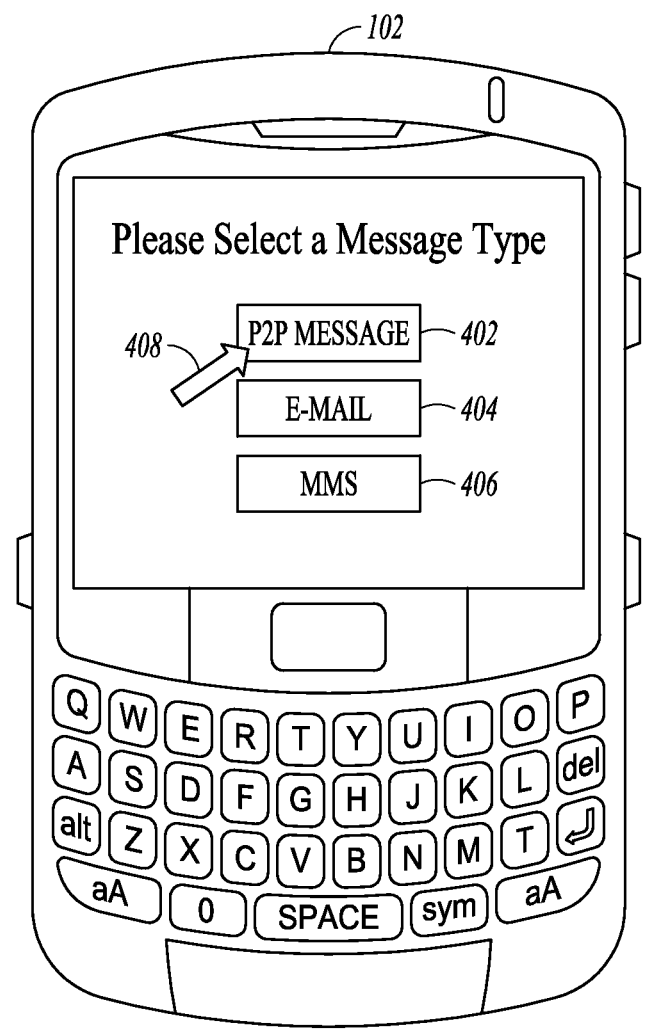
FIG. 4 shows an environment on an electronic device that allows a user to select a message type for sending a message based on a selected operation shown in FIG. 3 with respect to a good, service, and/or payment according to one example.

In the example of FIG. 3, the user (herein referred to as the "first user") has selected the "send request" option 316, as indicated by the arrow 318. This request can be referred to as a third-party beneficiary request since this option 316 is for requesting another user, i.e., a promisor, to purchase/fund the selected item for the use and benefit of the requesting user. The user interaction manager 114 detects the first user's selection to send a request and prompts the user to select a type of message for sending the request, as shown in FIG. 4. It should be noted that if the first user has configured the MBPE 112 with a default message type then the first user may not be prompted for a message type selection. As can be seen in FIG. 4, various message types supported by the device 102 such as a P2P message type 402, an email message type 404, and an MMS message type 406 are displayed to the first user. It should be noted that these message types 402, 404, 406 are only used for illustrative purposes only and other message types are applicable as well. In the example of FIG. 4, the first user has selected the P2P message type 402, as indicated by the arrow 408.

Figure 5:
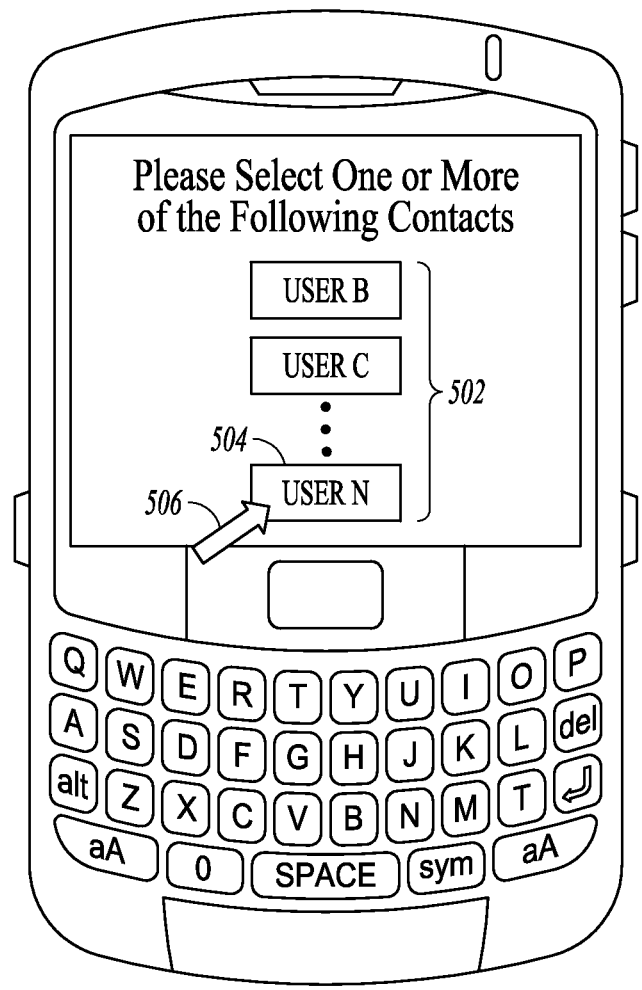
FIG. 5 shows an environment on an electronic device that allows a user to select one or more users to send an item request or gift message to according to one example.

Referring now to FIG. 5, the user interaction manager 114 detects that the first user has selected a message type and prompts the contact manager 116 to analyze the contact profile(s) 122 to identify a set of contacts that are potentially able or willing to satisfy the request for the selected item. In one example, the contact manager 116 filters the contact profile(s) 122 to identify contacts that are able to send/receive messages according to the messaging protocol selected by the first user. In another example, the first user is able to instruct the contact manager 116 to provide contacts from a specific community of contacts such as a given social network community contacts, business community contacts, P2P messaging community contacts, and the like. Once the contact manager 116 has identified a set of contacts 502 from the contact profile(s) 122, the MBPE 112 displays this set of contacts 502 to the first user, as shown in FIG. 5. The first user is also prompted to the select one or more contacts to satisfy the request. As can be seen in FIG. 5, the first user has selected User N 504, as indicated by the arrow 506.

Figure 6:
FIG. 6 shows an item request message according to one example.

Referring now to FIG. 6, once the first user has selected the user(s) (herein referred to as the "second user") to satisfy his/her gift request, the message generator 118 of the MBPE 112, via the messaging client 124 associated with the selected messaging type, begins to generate a message 602 to be transmitted to the second user, as shown in FIG. 6. For example, FIG. 6 shows a message 602 that comprises a messaging address 603 associated with the second user, a picture 604 of the item being requested by the first user, a description 606 of the item, a message 608 from the first user to the second user, and a selectable uniform resource locator 610. The selectable uniform resource locator 610, in combination with an optional security/transaction token (discussed below), allows the second user to interact with the procurement management system 106 to deny the request, satisfy, or partially satisfy the request. The selectable uniform resource locator 610 is useful in situations where the second user device 104 does not include the MBPE 112. If the second user device 104 does comprise the MBPE 112, the selectable uniform resource locator 610 is optionally not required. It should be noted that, in some examples, a separate selectable uniform resource locator 610 is not required. For example, the picture 604 of the selected item or the description 606 of the selected item can be selectable and comprise the uniform resource locator discussed above.

In addition to the request message 602 being generated, the security manager 120 also generates/retrieves one or more security mechanisms to be packaged with the request message 602. For example, the security manager 120 sends a request to the procurement management system 106 (or other system) for a security or transaction token. This request includes, in one example, an identifier associated with the selected good/service such as, but not limited to, an encoded stock keeping unit (SKU) and an identifier associated with the requesting user device 102. The procurement management system 106, via its security manager 142, authenticates the first user and device 102 using the information received from the security manager 120 of the first user device 102. For example, the security manager 142 of the procurement management system 106 compares the information received from the security manager 120 of the first user device 102 with information in the subscriber profile 140 associated with the first user.

Once the first user has been authenticated, the procurement management system 106 sends the requested token back to the security manager 120 of the first user device 102. In one example, the security/transaction token comprises security and/or transaction information such as, but not limited to, the encoded SKU of the selected item, the name of the first user, an email of the first user, a unique identifier associated with the first user device 102, and a unique identifier associated with the requested item. However, other security information is applicable as well. In one example, the security manager 120 then encrypts the security/transaction token with one or more encryption mechanisms.

The message generator 118 then packages the security/transaction token with the request message 602. If the request message 602 comprises the selectable uniform resource location 610, the security/transaction token can be packaged with the request message 602 such that when the second user selects the uniform resource location 610 the token is transmitted to the procurement management system 106. The messaging client 124 then transmits (either wirelessly or by wired mechanisms) the request message 602 to the second user. It should be noted that in one example, the first user is able to select an item, service, or fund transfer using another application that is separate and distinct from the MBPE 112. In this example, the application communicates with the MBPE 112. The MBPE 112 performs the security/authentication process discussed above and generates the security/transaction token. The application then receives the security/transaction token from the MBPE 112 and transmits the request message and the security/transaction token to the second user device 104.

It should be noted that request/gift messages are not limited to be sent via the messaging client 124. In other words, the virtual environment 132 or any other application that the first user requested an item from can send the request message 602 to the second user via an account associated with the environment 132, an application, or the like. For example, the first user can send a request message 602 from within an application, such as a game, to the second user for an in-game item. Also, the request/gifting functionality is not required to be provided by a component, such as the MBPE 112, residing on a user's device 102, 104. For example, the request/gifting functionality can be provided by a set of application programming interfaces (APIs) residing on a remote server such as the procurement management system 106.

The user device 104 of the second user then receives the request message 602 and is notified accordingly. The second user can be notified of the request message 602 in many different ways. For example, if the second user device 104 comprises the MBPE 112, a notification can be displayed to the second user when the second user opens or logs into the MBPE 112. In another example, a notification can be displayed to the second user when the second user opens or logs into a given application on his/her device or over the Internet. Additionally, in one example, the notification received by the second user (or gift recipient) is dependent upon the method used by the first user (or gifting user) to send the request message 602 (or gift message). For example, if the second user (or gift recipient) sends the request message 602 (or gift message) via a P2P message, the second user (or gift recipient) receives the notification via his/her P2P messaging client. However, in other examples, the method of receiving the notification is not dependent upon how the request message 602 (or gift message) was sent.

Figure 7:
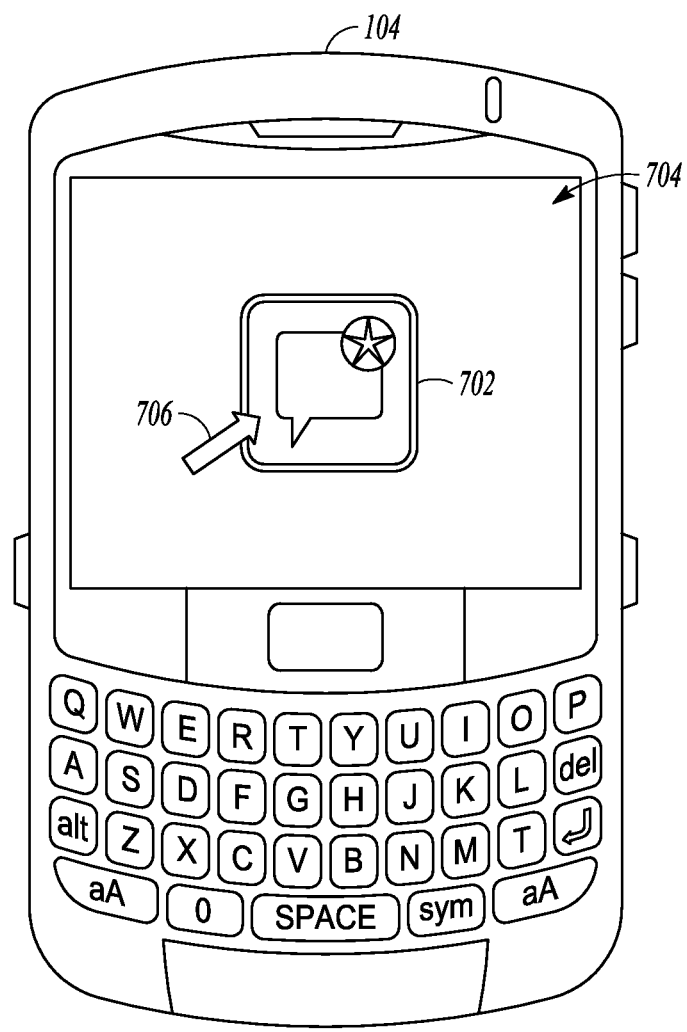
FIG. 7 shows one example of a notification on an electronic device that has received the item request message of FIG. 6 according to one example.
Figure 8:
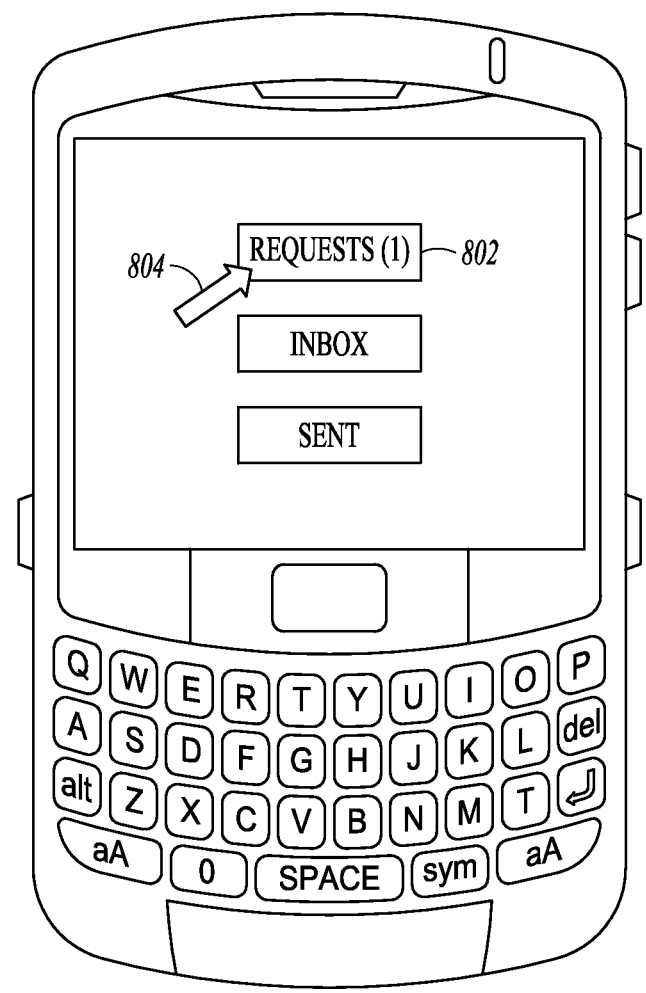
FIG. 8 shows an environment on an electronic device that displays a list of item request messages for a user according to one example.

FIG. 7 shows one example of a notification 702 being displayed to the second user on his/her device 104. In particular, FIG. 7 shows a messaging client notification 702 being presented on the display 704 of the device 104. It should be noted that the MBPE 112 can display the notification screens for request and gift messages itself, or can communicate with the APIs residing at the procurement management system 106 (or other system) to display the notification screens. FIG. 7 also shows that the second user has selected the notification (or widget displaying the notification) as indicated by the arrow 706. Once the second user selects the notification 702, opens an application associated with the notification 702, or logs into his/her account on a website associated with the notification 702, the second user is shown a list of gift requests 802 (or gift messages), as shown in FIG. 8. The second user is then able to select a given request message 802 as indicated by the arrow 804. It should be noted that in some instances the second user device 104 may not include the MBPE 112 or an application that is able to display request and gift messages. In these situations the second user is able to receive messages such as an email, text message, or the like with request or gifting information included therein. In these examples, the second user can be notified of the message by displaying a new message inbox indicator or by any other notification mechanism.

Figure 9:
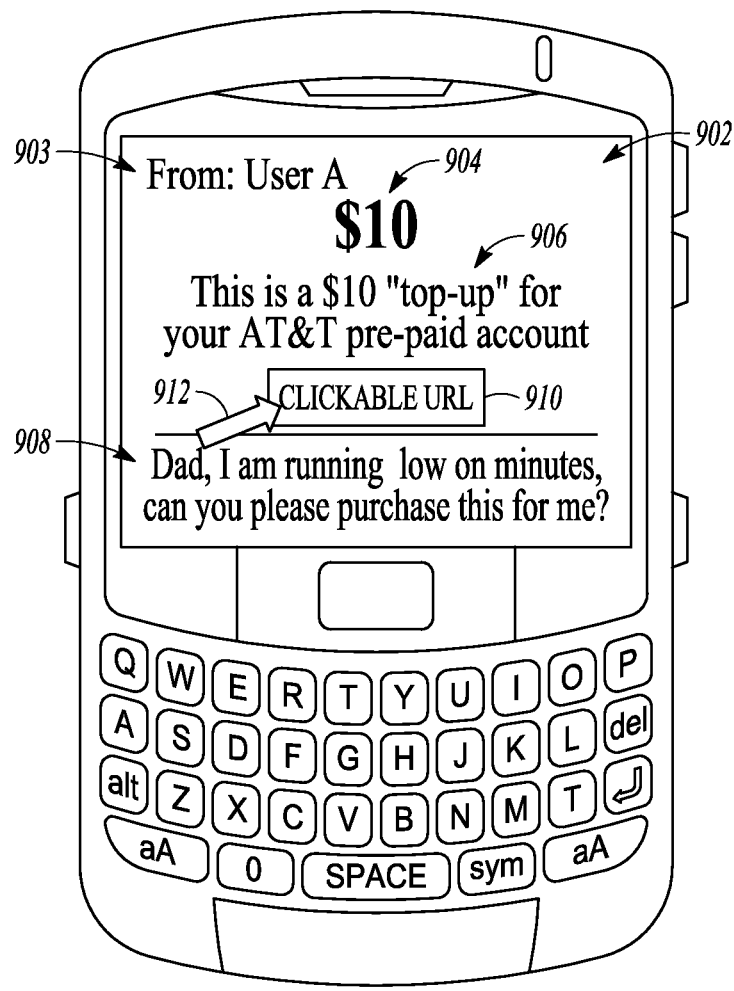
FIG. 9 shows the item request message of FIG. 6 as displayed on the recipient's electronic device according to one example.

Once the second user selects the request (or gift message) the second user is displayed the request message 902, as shown in FIG. 9. In the example of FIG. 9, the request message 902 comprises a "From" field 903 that displays the first user's name or address, a picture/video 904 of the requested item, a description 906 of the requested item, a message 908 from the first user, and a selectable URL 910. It should be noted that the request message 902 is not required to include one or more of these components. Also, one or more additional components can be added to the request message. For example, the selectable URL 910 is optionally not required if the second user device 104 of comprises the MBPE 112, but still can be included for security/authentication purposes. However, if the device 104 of the second user does not comprises the MBPE 112, then selectable URL 910 allows the second user device 104 to securely connect to the procurement management system 106 to satisfy or deny the request.

For example, FIG. 9 shows that the user has "clicked" on the selectable URL 910, as indicated by the arrow 912. As discussed above, the selectable URL 910 comprises the security/transaction token associated with the first user and the requested item. In an example where the second user's device 104 does not comprise the MBPE 112, the selection of the URL 910 establishes a secure connection with the procurement management system 106 via the security managers 130, 142 of the second user device 104 and the procurement management system 106. The security/transaction token is transmitted from the second device 104 to the procurement management system 106 through this secure connection. The transaction manager 138 (in optional conjunction with the security manager 142) at the procurement management system 106 decrypts the security/transaction token and analyzes its information. For example, the transaction manager 138 retrieves the encoded SKU of the requested item, the name of the requesting user, an email of the first user, a unique identifier associated with the first user device 102, and a unique identifier associated with the request transaction. It should be noted that these are only examples of some of the information that can be retrieved from the security/transaction token.

In one example, the transaction manager 138 analyzes a set of transaction IDs stored at the procurement management system in response to the security/transaction token being generated. The transaction manger 138 analyzes this set of stored transaction IDs to determine if a match is found with respect to the request transaction ID within the security/transaction token received from the second user device 104. If a match exists, the transaction manager 138 matches the information associated with the stored request transaction ID with the information included in the security/transaction token. For example, the transaction manager 138 determines if the name of the first user, email, device ID (or subscriber ID), etc. included within the security/transaction token matches the same information stored at the procurement management system 106 for the identified stored transaction ID. If the information matches, the transaction manager 138 generates a certificate of authentication and communicates this back to the second user device 104. If a match does not exist the transaction manager 138 notifies the second user device that the transaction could not be authenticated. It should be noted that other types of authentication are applicable as well.

Figure 10:
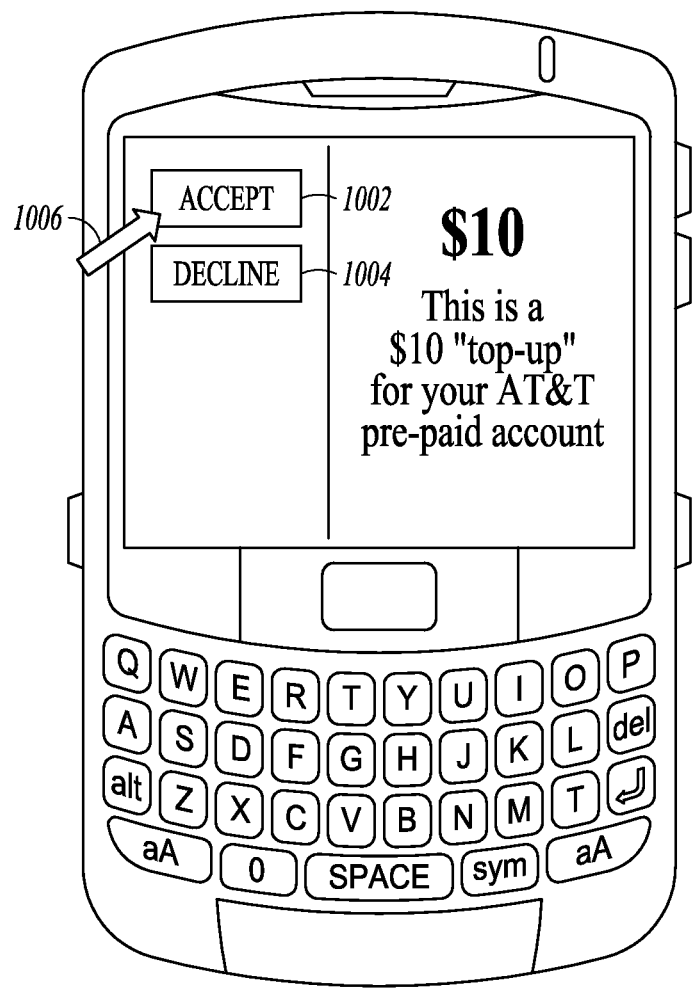
FIG. 10 shows an environment on an electronic device that allows a user who received the item request message in FIG. 9 to perform various operations with respect to the item requested in the message according to one example.

Once the request transaction has been authenticated, the procurement management system 106 displays, via the interactive interface(s) 126 at the second user device 104, one or more options that the second user can select with respect to the requested item, as shown in FIG. 10. For example, FIG. 10 shows that the second user is presented with a first option 1002 that allows the second user to accept the first user's request and a second option 1004 (e.g., a "decline" option) that allows the second user to decline the first user's request. It should be noted that if the second user's device 104 comprises the MBPE 112, the above authentication process can be optionally performed via the MBPE 112 on the second user device 104.

If the second user selects the decline option 1004, the second user can be presented with the option of writing a message to the first user. The first user is then sent a message informing him/her that the request has been declined. In one example, the "decline" message is sent to the first user via the same messaging mechanism used to send the second user the request message. In another example, the "decline" message is sent via a different messaging mechanism than what was used send the second user the request message. The various methods and examples of sending messages between users have been discussed above with respect to FIGS. 1-6. Also, the first user can be notified of the "decline" message similar to the examples discussed above with respect to FIGS. 7-8.

Figure 11:
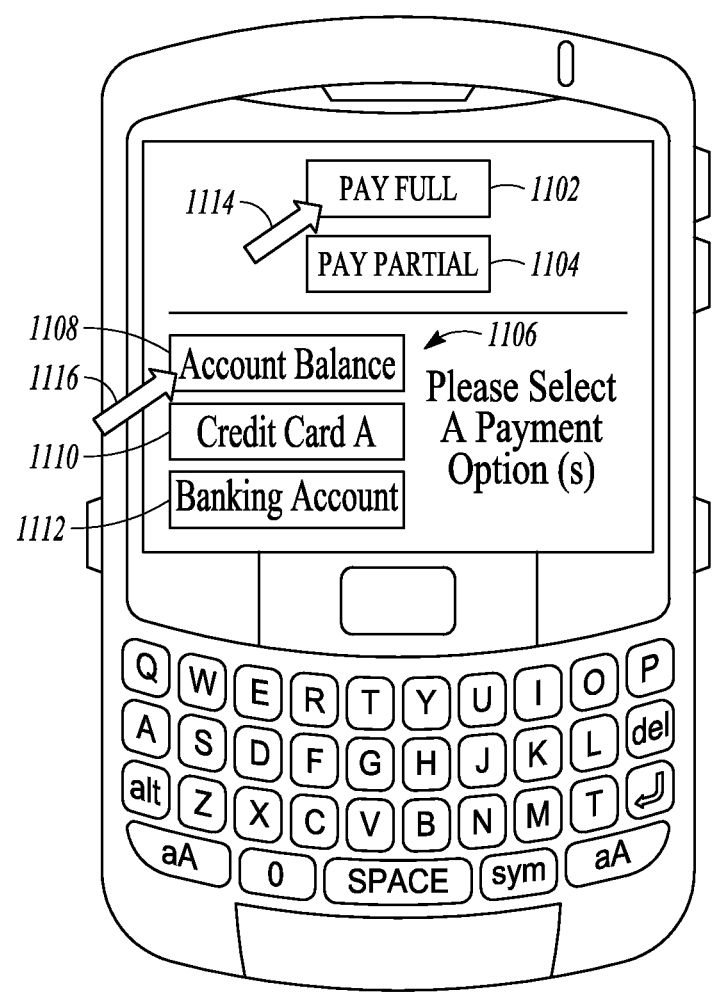
FIG. 11 shows an environment on an electronic device that allows the user of FIGS. 9-10 to select various payment options of satisfying the request in the item request message according to one example.

If the second user selects the "accept" option 1002, as shown by the arrow 1006 in FIG. 10, the second user is presented with an option 1102 to fund the purchase/payment of the item in its entirety and an option 1104 to partially fund the purchase/payment, as shown in FIG. 11. The second user is also provided with a set of payment options 1106 for funding (or partially funding) the purchase/payment of the item. For example, FIG. 11 shows a first option 1108 that allows the second user to use his/her account balance, a second option 1110 that allows the second user to use a given credit card, and a third option 1112 that allows the second user to use a banking account. It should be noted that other options can be presented to the second user as well, such as third-party payment systems and the second user's wireless carrier account. The account balance option 1108 can be linked to a virtual wallet of the second user, an account associated with the MBPE 112, a third-party payment service account, or the like. In one example, these various payments methods have been previously established/configured by the second user and stored in the subscriber profiles 140 at the procurement management system 106. In other examples, the second user is able to select a payment option and enter the payment information in response thereto. Even further, the contact manager 116 can select a set of contacts that also have the same application used by the first user to select the item for the request message.

If the second user selects the partial funding option 1104, the second user is prompted to enter the amount that he/she will pay. A message, via the messaging mechanism discussed above, is then sent to the requestor notifying him/her that the selected/recipient user has agreed to partially pay for the requested item. The first user is then presented with a screen, similar to that shown in FIG. 11, where the first user can either cancel the request, pay the remainder of the balance, partially pay the remainder of the balance and send another funding request to an additional user(s), or send one or more messages back to the second user to perform further negotiations. Additionally, the second user can also send a request to one or more additional users to help partially pay for the purchase of the item. When all of the funding has been provided from all involved users, each party is notified accordingly.

Figure 12:
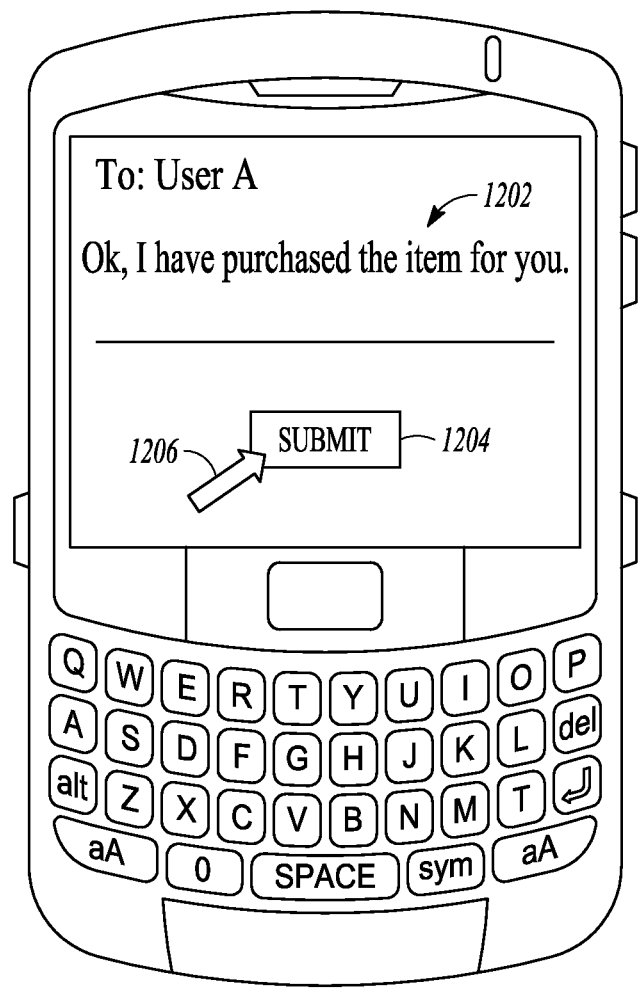
FIG. 12 shows an environment on an electronic device that allows the user of FIGS. 9-11 to create a message to the user who sent the item request message and submit the transaction for processing according to one example.

FIG. 11 shows that the second user has selected the pay-in-full option 1102 and the option 1108 to use his/her account balance, as indicated by the arrows 1114, 1116. The second user is then optionally presented with a message screen 1202, as shown in FIG. 12, where the second user can write a message to the first user. The second user is also presented with an option 1204 to submit the transaction (or cancel the transaction). Once the second user submits the transaction, as indicated by the arrow 1206, the second user acts as a promisor with respect to funding the purchase of the good, purchase of the service, or payment on behalf of the first user. The second user device 104 then sends the transaction to the procurement management system 106. The transaction manager 138 at the procurement management system 106 authenticates the second user. For example, the submitted transaction can include various identifiers associated with the second user and/or the user device 104 such as the name of the second user, an email of the second user, a unique identifier associated with the second user device 104, a pin number, or the like. The transaction manager 138 matches this information to a subscriber profile 140 associated with the second user to verify the second user's identity. It should be noted that this authentication process is optional. Also, if the second user's device 104 includes the MBPE 112, the MBPE 112 can perform this authentication process at the device itself.

Once the second user has been authenticated, the second user's payment information within the submitted transaction is then processed by the transaction manager 138 or a payment processing service residing at another system. In an example where the MBPE 112 authenticates the second user and the submitted transaction, the MBPE 112 sends a payment processing request to the procurement management system 106 (or another payment processing system) that comprises payment information, purchased item identification information, identification associated with the second user, and/or any other information required to process the transaction. The payment is processed and the goods/service provider 108 is notified that the requested item has been purchased. The goods/service provider 108 is also provided with information associated with the transaction, first user device 102, the second user, and/or the second user device 104. This information allows the goods/service provider 108 to verify the identity of the first user device 102 when the first user device 102 submits a request to download requested item. Alternatively, this information allows the goods/service provider 108 to "push" the purchased goods/service/funds to the first user device 102 or the first user's account. In yet another example, this information allows the goods/service provider 108 to effectuate the physical shipment of the physical good or the dispatchment of a service to the shipping/service address of the first user.

The goods/service provider 108 can notify the procurement management system 106 when a successful delivery or unsuccessful delivery of the goods/services/funds to the first user or first user device 102 has occurred. The procurement management system 106 (or other payment processing system) also sends a receipt to the second user device 104 that the payment was successful and a receipt to the first user device 102 indicating the request has been fulfilled. Also, when the first user retrieves or receives his/her requested item, then the second user can be sent a notification from the first user, the procurement management system 106, and/or the goods/service provider 108.

In addition to fulfilling a request for an item, a first user can send ("gift") goods/services/funds to a second user (or multiple users) without being requested to do so. For example, the first user can select the gift option 312 shown in FIG. 3. In this example, similar processes discussed above with respect to FIGS. 4-12 are performed, where a gift message is sent to the second user instead of a request message. The second user is able to accept the gift, decline the gift, or transfer the gift to another user. Gifts can be full paid gifts or partially paid gifts where the second user is required to satisfy the remaining balance if he/she selects to accept the gift.

As discussed above, users can also transfer and request funds to and from other users. The examples discussed above with respect to FIGS. 1-12 apply to fund transfers as well. In addition, funds can be transferred from many different accounts such as, but not limited to, credit cards, banking accounts, third-party payment accounts, and wireless carrier accounts (e.g., stored value accounts). In addition to the examples given above, fund transfers can occur in a "chat" environment between users using the messaging clients 124, 128. For example, within a P2P chat, one of the menu options can be "send funds". If the user has sufficient funds in their virtual wallet, the user can be shown the amount of funds available, and prompted to enter an amount for transfer. If there are insufficient funds, the user is prompted to add more funds.

If the user is in a group chat, the user can be presented with the option to "send to all" or "send to select". If the user chooses to "send to all", the user is prompted to enter the amount to send to all members of the group. If the user chooses to "send to select", the user is presented with a list of all group members, with a field beside each name that allows the entry of a custom amount to transfer. The user can send funds to all members with this method with the additional benefit of being able to send each member different amounts. The user can then be shown a summary of the transaction and is able to confirm and send the payment. The receiving user(s) is then prompted to either accept or deny the fund transfer.

In an example directed to transferring funds, the user can be presented with an option to "request funds" while in a "chat" environment between users using the messaging clients 124, 128. The user can be prompted to enter the amount to request and provide a comment/explanation of the request. Within a group chat, the user can be presented with the option to "request from all" or "request from select". If the user chooses to "request from all", the user is be prompted to enter the amount to request from all members of the group. If the user chooses to "request from select", the user is presented with a list of all group members, with a field beside each name that allows the entry of a custom amount to request. The user can request funds from all members with this method with the additional benefit of being able to request different amounts from each member. The user is shown a summary of the amounts before confirming and sending the request. The recipient(s) is notified of the request, and prompted to "Send Funds" or "Decline". If the recipient chooses to Send Funds, the send process is initiated. If the recipient chooses to decline, the requestor is notified. For example, the status of message can be changed to indicate that the request has been declined.

It should be noted that in examples where a first user is requesting funds from a second user or the second user is sending funds to the first user without receiving a request, the first or second user is able to set conditions on the use of the funds. For example, funds can be designated to only be used in a given virtual environment, for a given application, music file, video file, or the like. Alternatively, a third-party, such as wireless carrier, can also designate how funds are to be used, in some examples, where the funds are coming from a wireless carrier account.

Figure 13:
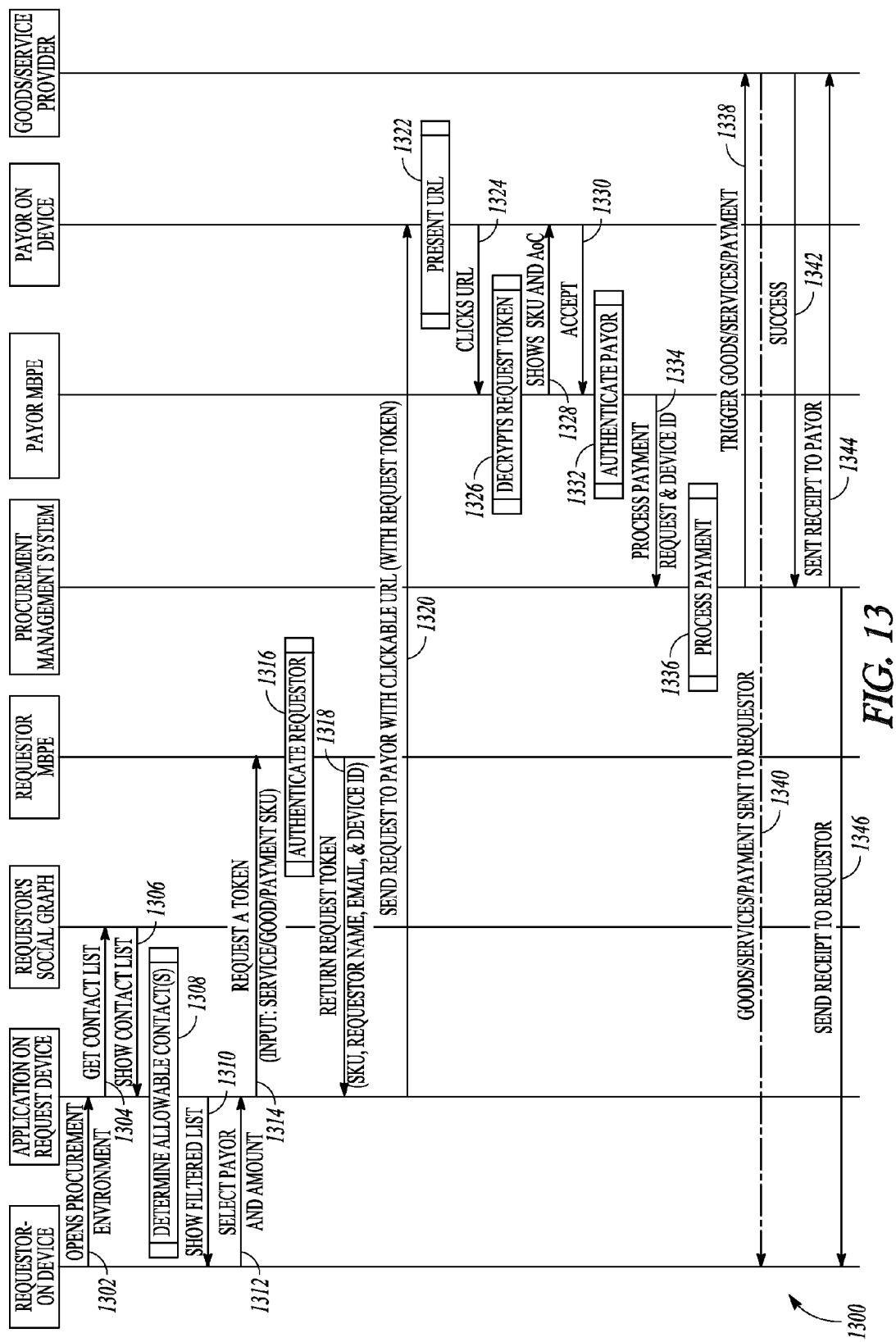
FIG. 13 is a flow diagram for a message based procurement process according to one example.

FIG. 13 is a flow diagram for message based procurement process 1300. The message based procurement process 1300 allows a first user to send a request (or gift message) to at least a second user, via one or more messages, to have the second user fund a purchase of a good, a purchase of a service, or a payment on behalf of the first user, for the use and benefit by the first user, as discussed above with respect to FIGS. 1-12. The message based procurement process 1300 begins by a first user, at step 1302, opening an application, selecting a good, service, payment, and selecting a "request" option 316, as discussed above with respect to FIG. 3, that the first user is interested in. It should be noted that this application can be the same as the MBPE 112 or a separate application that is associated with the selected good, service, or payment, as discussed above. The contact manager 116, at step 1304, retrieves the contact profile(s) 122 stored on the first user's device 102 or on a separate system. The contact manager 116, at step 1306, shows a list of contacts to the user. The contact manager 116, at step 1308, determines a set of allowable contacts from the list of contacts, and, at step 1310, presents these allowable contacts to the first user, as discussed above with respect to FIG. 5.

The first user, at step 1312, selects a second contact from the allowable contacts. The application, at step 1314, requests a security/transaction token from the MBPE 112 (or the procurement management system 106), as discussed above. It should be noted that if the application is the MBPE 112 the MBPE 112 can generate the security/transaction token or request a security/transaction token from the procurement management system 106 as well. The MBPE 112 (or procurement management system 106), at step 1316, authenticates the first user, as discussed above. Once the first user is authenticated, the MBPE 112 (or procurement management system 106), at step 1318, returns a security/transaction token to the application. The application, at step 1320, sends a request message 602 to the second user, as discussed above, with respect to FIGS. 6 and 7.

The second user device 104, at step 1322, presents the request message to the second user, as discussed above with respect to FIGS. 7-9. The second user, at step 1324, selects the URL 910 within the displayed message 902. The second user device 104, in the example of FIG. 13, comprises an MBPE 112. Therefore, the MBPE 112, at step 1326, decrypts the security/transaction token, as discussed above. However, if the second user device 104 does not comprise an MBPE 112, then a secure connection is established between the second user device 104 and the procurement management system 106 is to perform the decryption and authentication processes discussed below. One the security/transaction token is decrypted, the MBPE 112 at the second user device 104, at step 1328, shows information associated with the requested item and a certificate of authentication to the second user. The second user, at step 1330, accepts the request to fund the request from the first user, as discussed above with respect to FIGS. 10-12. The MBPE 112 at the second user device 104 (or the procurement management system 106), at step 1332, authenticates the second user, as discussed above.

The MBPE 112 at the second user device 104, at step 1334, sends a payment processing request comprising the device ID or subscriber ID to the procurement management system 106 (or another system comprising payment processing services). The procurement management system 106, at step 1336, processes the payment. The procurement management system 106, at step 1338, sends a trigger message to the goods/service provider 108 that a payment has been received for a given good, service, or fund transfer. If the goods/service provider 108 is to "push" or ship the requested item to the first user, the goods/service provider 108, at step 1340, sends or ships the requested item to the first user or first user's account. The goods/service provider, at step 1342, notifies the procurement management system 106 of when the requested item has been successfully (or unsuccessfully) processed. The procurement management system 106, at step 1344, sends a payment receipt to the second user. The procurement management system 106, at step 1346, also sends a receipt to the first user notifying him/her that the second user fulfilled his/her request. The control flow then ends. The processes of steps 1302 to 1346 have been described above with respect to FIGS. 1-12 in greater detail.

Electronic Devices

Figure 14:
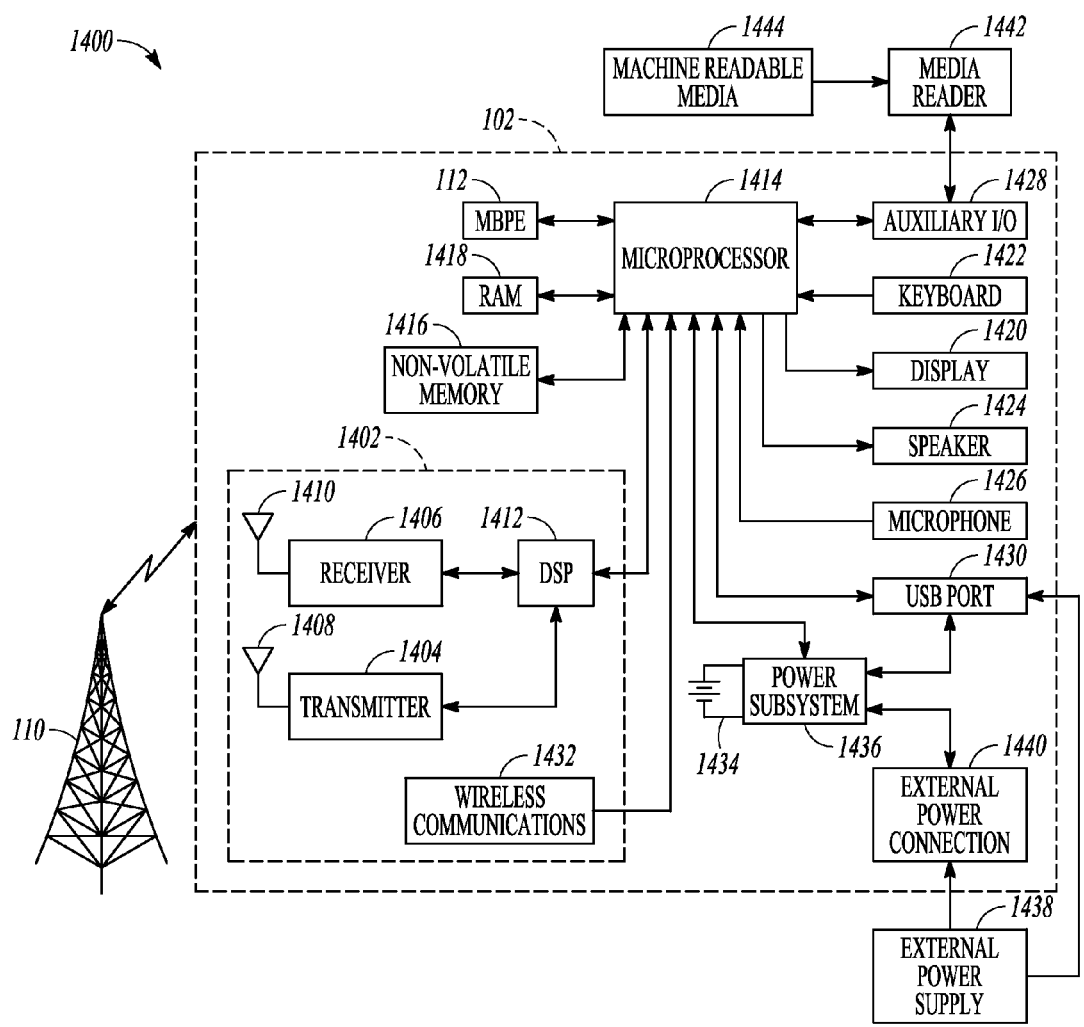
FIG. 14 is a block diagram of another electronic device and associated components in which the systems and methods disclosed herein may be implemented.

FIG. 14 is a block diagram of an exemplary electronic device and associated components 1400 in which the systems and methods disclosed herein may be implemented. In this example, an electronic device is the user device 102, 104 discussed above with respect to FIGS. 1-13 and is a wireless two-way communication device with voice and data communication capabilities. Such electronic devices communicate with a wireless voice or data network 110 using a suitable wireless communications protocol. Wireless voice communications are performed using either an analog or digital wireless communication channel. Data communications allow the electronic device 102 to communicate with other computer systems via the Internet. Examples of electronic devices that are able to incorporate the above described systems and methods include, for example, a data messaging device, a two-way pager, a cellular telephone with data messaging capabilities, a tablet computing device, a wireless Internet appliance or a data communication device that may or may not include telephony capabilities.

The illustrated electronic device 102 is an example electronic device that includes two-way wireless communications functions. Such electronic devices incorporate a communication subsystem 1402 comprising elements such as a wireless transmitter 1404, a wireless receiver 1406, and associated components such as one or more antenna elements 1408 and 1410. A digital signal processor (DSP) 1412 performs processing to extract data from received wireless signals and to generate signals to be transmitted. The particular design of the communication subsystem 1402 is dependent upon the communication network and associated wireless communications protocols with which the device is intended to operate.

The electronic device 102 includes a microprocessor 1414 that controls the overall operation of the electronic device 102. The microprocessor 1414 interacts with the above described communications subsystem elements and also interacts with other device subsystems such as non-volatile memory 1416, random access memory (RAM) 1418, user interfaces such as a display 1420, a keyboard 1422, a speaker 1424, and a microphone 1426, auxiliary input/output (I/O) device 1428, Universal Serial Bus (USB) Port 1430, short and long range communication subsystems, a power subsystem and any other device subsystems.

A battery 1434 is connected to a power subsystem 1436 to provide power to the circuits of the electronic device 102. The power subsystem 1436 includes power distribution circuitry for providing power to the electronic device 102 and also contains battery charging circuitry to manage recharging the battery 1434. The external power supply 1438 is able to be connected to an external power connection 1440 or through a USB port 1430.

The USB port 1430 further provides data communication between the electronic device 102 and one or more external devices, such as an information processing system. Data communication through USB port 1430 enables a user to set preferences through the external device or through a software application and extends the capabilities of the device by enabling information or software exchange through direct connections between the electronic device 102 and external data sources rather than via a wireless data communication network. In addition to data communication, the USB port 1430 provides power to the power subsystem 1436 to charge the battery 1434 or to supply power to the electronic circuits, such as microprocessor 1414, of the electronic device 102.

Operating system software used by the microprocessor 1414 is stored in non-volatile memory 1416. Further examples are able to use a battery backed-up RAM or other non-volatile storage data elements to store operating systems, other executable programs, or any combination of the above. The operating system software, device application software, or parts thereof, are able to be temporarily loaded into volatile data storage such as RAM 1418. Data received via wireless communication signals or through wired communications are also able to be stored to RAM 1418. As an example, a computer executable program configured to perform the message based procurement process 1300, discussed above, is included in a software module stored in non-volatile memory 1416.

The microprocessor 1414, in addition to its operating system functions, is able to execute software applications on the electronic device 102. A predetermined set of applications that control basic device operations, including at least data and voice communication applications, is able to be installed on the electronic device 102 during manufacture. Examples of applications that are able to be loaded onto the device may be a personal information manager (PIM) application having the ability to organize and manage data items relating to the device user, such as, but not limited to, e-mail, instant messaging, calendar events, voice mails, appointments, and task items.

Further applications may also be loaded onto the electronic device 102 through, for example, a wireless network 110, an auxiliary I/O device 1428, USB port 1430, communication subsystem 1402, or any combination of these interfaces. Such applications are then able to be installed by a user in the RAM 1418 or a non-volatile store for execution by the microprocessor 1414.

In a data communication mode, a received signal such as a text message or web page download is processed by the communication subsystem, including wireless receiver 1406 and wireless transmitter 1404, and communicated data is provided the microprocessor 1414, which is able to further process the received data for output to the display 1420, or alternatively, to an auxiliary I/O device 1428 or the USB port 1430. A user of the electronic device 102 may also compose data items, such as e-mail messages, using the keyboard 1422, which is able to include a complete alphanumeric keyboard or a telephone-type keypad, in conjunction with the display 1420 and possibly an auxiliary I/O device 1428. Such composed items are then able to be transmitted over a communication network through the communication subsystem.

For voice communications, overall operation of the electronic device 102 is substantially similar, except that received signals are generally provided to a speaker 1424 and signals for transmission are generally produced by a microphone 1426. Alternative voice or audio I/O subsystems, such as a voice message recording subsystem, may also be implemented on the electronic device 102. Although voice or audio signal output is generally accomplished primarily through the speaker 1424, the display 1420 may also be used to provide an indication of the identity of a calling party, the duration of a voice call, or other voice call related information, for example.

Depending on conditions or statuses of the electronic device 102, one or more particular functions associated with a subsystem circuit may be disabled, or an entire subsystem circuit may be disabled. For example, if the battery temperature is low, then voice functions may be disabled, but data communications, such as e-mail, may still be enabled over the communication subsystem.

A short range/long range wireless communications subsystem 1432 is a further optional component which may provide for communication between the electronic device 102 and different systems or devices such. However these different systems or devices need not necessarily be similar devices as discussed above. The wireless communications subsystem 1432 comprises one or more wireless transceivers, optionally associated circuits and components, and an optional infrared device for communicating over various networks such implementing one or more wireless communication technologies such as, but not limited to, Bluetooth® and/or a wireless fidelity technologies.

A media reader 1442 is able to be connected to an auxiliary I/O device 1428 to allow, for example, loading computer readable program code of a computer program product into the electronic device 102 for storage into non-volatile memory 1416. One example of a media reader 1442 is an optical drive such as a CD/DVD drive, which may be used to store data to and read data from a computer readable medium or storage product such as machine readable media (computer readable storage media) 1444. Examples of suitable computer readable storage media include optical storage media such as a CD or DVD, magnetic media, or any other suitable data storage device. Media reader 1442 is alternatively able to be connected to the electronic device through the USB port 1430 or computer readable program code is alternatively able to be provided to the electronic device 102 through the wireless network 110.

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A mobile device comprising:
   at least one input device to receive physical input;
   a display to present an interactive user interface, the interactive user interface to receive one or more commands that are correlated to the physical input via the at least one input device;

a wireless communication subsystem;
a memory; and
a processor configured to:
  receive, via a first electronic selection caused by a first physical input received by the at least one input device and received by the interactive user interface, a selection of at least one of a good, a service, and a payment presented within the interactive user interface;
  present, via the interactive user interface on the display, subsequent to receiving the selection, a set of contacts stored in the memory;
  receive, via a second electronic selection caused by a second physical input received by the at least one input device and received by the interactive user interface, a selection of at least one promisor from the set of contacts;
  transmit, from the mobile device, a first request for an electronic security/transaction token to a remote information processing system operatively coupled with a procurement management system, the first request comprising an identifier of the selected at least one of a good, a service, and a payment, and an identifier associated with a user of the mobile device;
  obtain, at the mobile device, the electronic security/transaction token from the remote information processing system, the electronic security/transaction token being associated with the first request and comprising at least an identifier associated with a user of the mobile device and an identifier associated with the selected at least one of the good, the service, and the payment;
  encrypt, at the mobile device, the electronic security/transaction token;
  cause the wireless communication subsystem to generate a wireless message, wherein generating the wireless message comprises packaging at least the encrypted electronic security/transaction token and an identifier associated with the at least one promisor into the wireless message; and
  cause the wireless communication subsystem to transmit the wireless message comprising a second request to a second mobile device associated with the at least one promisor to request the promisor to pay for the selected at least one of a good, a service, and a payment, on behalf of the user of the mobile device that made the selection as the third-party beneficiary, the encrypted electronic security/transaction token being used by the second mobile device associated with the at least one promisor to transmit a message along with the encrypted electronic security/transaction token to the remote information processing system operatively coupled with the procurement management system, to one of securely deny the second request to pay, securely satisfy the second request, or securely partially satisfy the second request, by the procurement management system matching information contained in the encrypted electronic security/transaction token from the second request to information contained in the electronic security/transaction token associated with the first request.

2. The mobile device of claim 1, wherein the processor is further configured to:
  present, via the interactive user interface on the display, prior to receiving the selection, an electronic catalog comprising at least one of a good and a service.

3. The mobile device of claim 2, wherein operations to present the electronic catalog further comprises:
  identifying items of interest within the electronic catalog requested based on at least one of:
    an audio clip;
    a photo; and
    a barcode.

4. The mobile device of claim 1, wherein the wireless message further comprises:
  a selectable uniform resource locator (URL) associated with the at least one of the good, the service, and the payment that has been selected.

5. The mobile device of claim 1, wherein the wireless message is one of:
  a peer-to-peer (P2P) message;
  an e-mail message;
  a short message service (SMS) message;
  a multimedia messaging service (MMS) message; and
  a social network message.

6. The mobile device of claim 1, wherein operations to present the set of contacts further comprises:
  determining a type of the wireless message that is to be generated subsequent to receiving the selection; and
  selecting the set of contacts from another set of contacts associated with the type of the wireless message.

7. The mobile device of claim 1, wherein operations to present the set of contacts further comprises:
  selecting the set of contacts based on a relationship of each contact in the set of contacts.

8. The mobile device of claim 1, wherein the processor is further configured to cause the wireless communication subsystem to:
  receive, in response to transmitting the wireless message, the at least one of the good, the service, and the payment.

9. The mobile device of claim 1, wherein the at least one of the good, the service, and the payment is one of:
  an application;
  a multimedia file; and
  a replenishment of a stored-value account.

10. The mobile device of claim 9, wherein the stored-value account is for a wireless service provider.

11. The mobile device of claim 1, wherein obtaining the security token further comprises:
  wirelessly transmit, prior to generating the wireless message, an electronic request for the security token to a system managing a procurement of the at least one of the good, the service, and the payment, the request comprising an identifier associated with the at least one of the good, the service, and the payment.

12. A non-transitory computer-readable medium including instructions that, when executed by a processor of a mobile device, cause the mobile device to perform operations comprising:
  dynamically presenting a third-party beneficiary option within the interactive user interface, the third-party beneficiary option being selectable by user input received at the interactive user interface, the selection of the third-party beneficiary option indicating to the processor that a promisor is to pay for the at least one of a good, a service, and a payment on behalf of a user of the mobile device as a third-party beneficiary, and wherein the third-party beneficiary option presented within the interactive user interface is not associated with a specific promisor;
  receiving, via a first electronic selection correlated to a first physical input received by at least one input device and received by an interactive user interface presented on a display of the mobile device, a selection of the third-party beneficiary option;

presenting, via the interactive user interface on the display, in response to receiving the selection of third-party beneficiary option, a set of contacts stored in a memory of the mobile device;

receiving, via a second electronic selection correlated to a second physical input received by the at least one input device and received by the interactive user interface, a selection of at least one promisor from the set of contacts;

transmitting, from the mobile device, a first request for an electronic security/transaction token to a remote information processing system operatively coupled with a procurement management system, the first request comprising an identifier of the selected at least one of a good, a service, and a payment, and an identifier associated with the user of the mobile device;

obtaining, at the mobile device, the electronic security/transaction token from the remote information processing system, the electronic security/transaction token being associated with the first request and comprising at least an identifier associated with the user of the mobile device and an identifier associated with the selected at least one of the good, the service, and the payment;

encrypting, at the mobile device, the electronic security/transaction token;

causing a wireless communication subsystem of the mobile device to generate a wireless message, wherein generating the wireless message comprises packaging at least the encrypted electronic security/transaction token and an identifier associated with the at least one promisor into the wireless message; and causing the wireless communication subsystem to transmit the wireless message comprising a second request to a second mobile device associated with the at least one promisor to request the promisor to pay for the selected at least one of a good, a service, and a payment, on behalf of the user of the mobile device that made the selection as the third-party beneficiary, the encrypted electronic security/transaction token being used by the second mobile device associated with the promisor to transmit a message along with the encrypted electronic security/transaction token to the remote information processing system operatively coupled with the procurement management system, to one of securely deny the second request to pay, securely satisfy the second request, or securely partially satisfy the second request, by the procurement management system matching information contained in the encrypted electronic security/transaction token from the second request to information contained in the electronic security/transaction token associated with the first request.

13. The non-transitory computer-readable medium of claim 12, wherein obtaining the security token further comprises:

wirelessly transmitting, prior to generating the wireless message, an electronic request for the security token to a system managing a procurement of the at least one of the good, the service, and the payment, the request comprising an identifier associated with the at least one of the good, the service, and the payment.

* * * * *